US012472758B2

(12) United States Patent
Sato et al.

(10) Patent No.: US 12,472,758 B2
(45) Date of Patent: Nov. 18, 2025

(54) PRINTING DEVICE

(71) Applicant: SEIKO EPSON CORPORATION, Tokyo (JP)

(72) Inventors: Takumi Sato, Matsumoto (JP); Shoji Akatsu, Shiojiri (JP); Shuhei Kurotobi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 18/454,386

(22) Filed: Aug. 23, 2023

(65) Prior Publication Data

US 2024/0066898 A1 Feb. 29, 2024

(30) Foreign Application Priority Data

Aug. 25, 2022 (JP) ................................ 2022-134089

(51) Int. Cl.
*B41J 15/04* (2006.01)
*B41J 15/16* (2006.01)
*B65H 75/28* (2006.01)

(52) U.S. Cl.
CPC ........... *B41J 15/046* (2013.01); *B41J 15/042* (2013.01); *B41J 15/16* (2013.01); *B65H 75/28* (2013.01); *B65H 2801/15* (2013.01)

(58) Field of Classification Search
CPC ......... B41J 15/046; B41J 15/16; B41J 15/042
See application file for complete search history.

(56) References Cited

U.S. PATENT DOCUMENTS

2023/0249481 A1* 8/2023 Wakayama ............ B41J 15/046 270/1.01

FOREIGN PATENT DOCUMENTS

JP 2016-203390 A 12/2016

* cited by examiner

*Primary Examiner* — Jeremy R Severson
(74) *Attorney, Agent, or Firm* — WORKMAN NYDEGGER

(57) ABSTRACT

A printing device 1 includes a print section 8 for printing on a continuous medium M, a pair of holding sections 3 each having an insertion section 15 configured to be inserted into one of a first winding core of the wound medium M or a second winding core for winding the medium M from an outer side in an extending direction of the winding core, and a support section 19 for supporting the holding section 3, wherein the support section 19 is disposed closer to the print section 8 than the holding section 3 in a first direction, which is a direction from the holding section 3 toward the support section 19, of directions perpendicular to the extending direction of the winding core. By adopting the printing device 1 having such a configuration, it is possible to configure the printing device 1 to be lowered.

8 Claims, 4 Drawing Sheets

PRINTING DEVICE

The present application is based on, and claims priority from JP Application Serial Number 2022-134089, filed Aug. 25, 2022, the disclosure of which is hereby incorporated by reference herein in its entirety.

BACKGROUND

1. Technical Field

The present disclosure relates to a printing device.

2. Related Art

The related art shows various printing devices that have been used. Among them, there is a printing device is configured to form an image on a roll-shaped medium. For example, JP-A-2016-203390 discloses a printing device including a holding section that holds a medium in a roll shape and a winding section that winds the medium on which images were formed in a roll shape.

In printing devices such as that of JP-A-2016-203390, which include a holding section that holds a medium in a roll shape and a winding section that winds the medium on which images were formed into a roll shape, rails or the like that enable the holding section and the winding section to move in the widthwise direction are generally provided below the holding section and the winding section in order to sandwich a paper tube or the like on which the medium is wound from both sides in the widthwise direction. However, with such a configuration, the printing device tends to become larger in the height direction.

SUMMARY

In order to achieve the above problem, a printing device according to this disclosure includes a print section for printing on a continuous medium, a pair of holding sections each having an insertion section configured to be inserted into a winding core, which is either a first winding core for wound medium or a second winding core for winding up the medium, from an outer side in an extending direction of the winding core, and a support section for supporting the holding sections, wherein the support section is disposed closer to the print section than the holding sections in a first direction, which is, among directions perpendicular to the extending direction of the winding core, a direction from the holding sections toward the support section.

DESCRIPTION OF EMBODIMENTS

Figure 1:
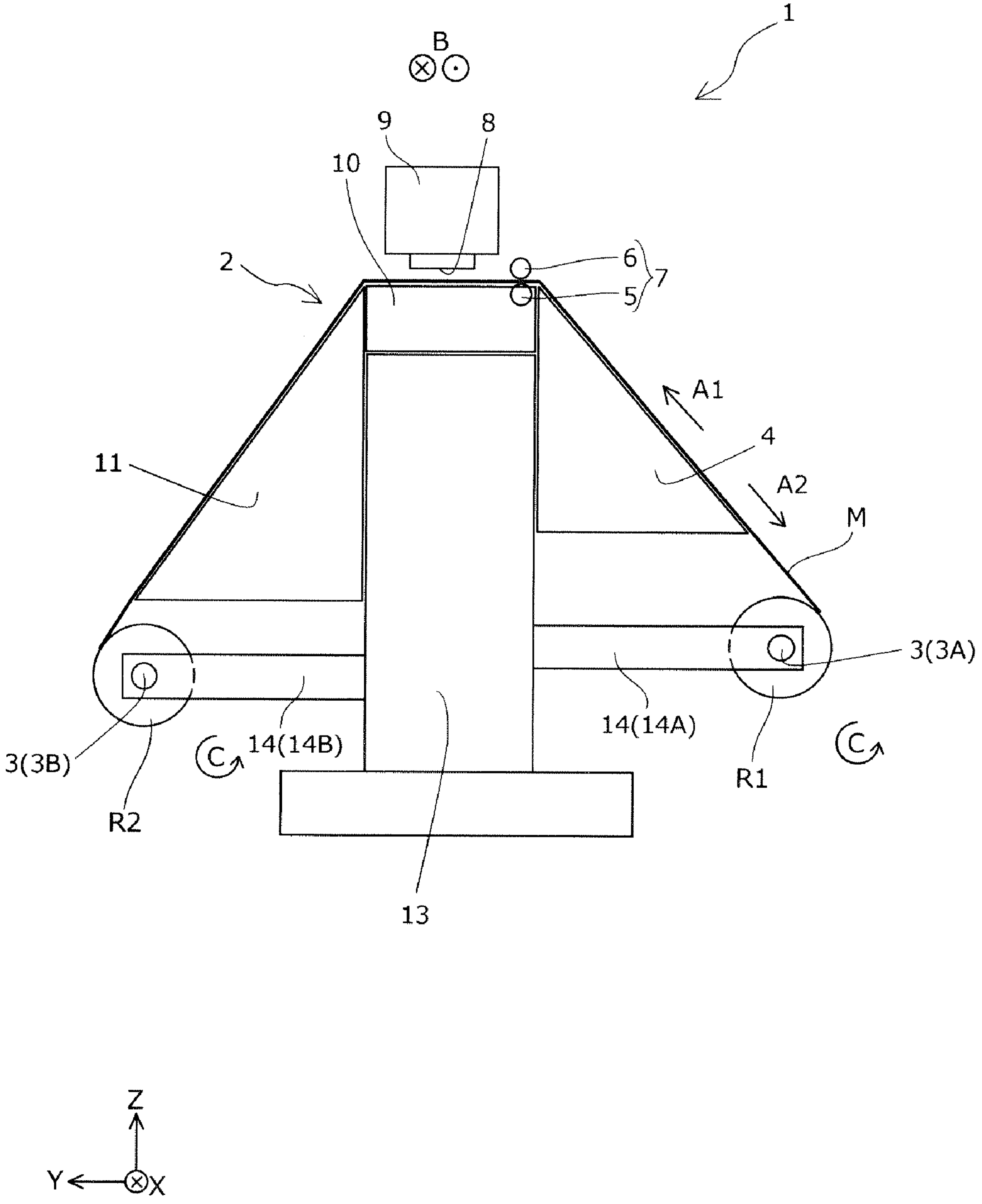
FIG. 1 is a schematic view of a printing device according to an embodiment of the present disclosure.

First, the present disclosure will be generally described.

In order to achieve the above problem, a printing device of the first aspect of the present disclosure includes a print section for printing on a continuous medium, a pair of holding sections each having an insertion section configured to be inserted into a winding core, which is either a first winding core for wound medium or a second winding core for winding up the medium, from an outer side in an extending direction of the winding core, and a support section for supporting the holding sections, wherein the support section is disposed closer to the print section than the holding sections in a first direction, which is, among directions perpendicular to the extending direction of the winding core, a direction from the holding sections toward the support section.

According to the present aspect, the printing device includes a pair of holding sections each having an insertion section for a first winding core of a wound medium or a second winding core for winding the medium and a support section for supporting the holding sections, wherein the support section is disposed closer to the printing section than the holding section in a first direction, which is a direction from the holding section toward the support section, of the directions perpendicular to the extending direction of the winding core. That is, the supporting section that enables the holding section to move in the width direction can be arranged side by side in the horizontal direction with respect to the holding sections instead of in the lower portion of the holding section. Therefore, the printing device can be configured to be lowered.

In a printing device of the second aspect of the present disclosure, according to the first aspect, the support section extends in the extending direction and supports the holding sections so that the holding sections are movable along the extending direction.

According to the present aspect, the support section extends in the extending direction and supports the holding section so as to be movable along the extending direction. Therefore, the winding core such as a paper tube around which the medium is wound can be easily sandwiched from both sides in the width direction.

A printing device of the third aspect of the present disclosure, according to the first or second aspect, further includes a restricting section, wherein the restricting section is disposed on an opposite side of the support section than the holding sections with respect to the first direction and restricts rotation of the holding sections, which are rotatably supported with the support section as a rotation shaft.

According to the present aspect, the holding section is rotatably supported around the supporting section as the rotation shaft, and a restricting section for restricting the rotation of the holding section is provided on the side opposite to the holding section with respect to the rotation shaft. Therefore, it is possible to simplify the configuration of the holding section and the support section, and it is also possible to suppress the holding section from rotating with the support section as a rotation shaft.

A printing device of the fourth aspect of the present disclosure, according to the third aspect, further includes a medium support section which is disposed to face the print section and that supports the medium, a plurality of leg sections supporting the medium support section, and a coupling section coupling the plurality of leg sections, wherein and the coupling section also serves as the restricting section.

According to the present aspect, the coupling section also serves as the restricting section. The rigidity of the device can be increased by the configuration in which the plurality of leg sections are coupled, and the configuration in which the holding section is prevented from rotating around the support section as the rotation shaft can be achieved by a simple configuration of the coupling section coupling the plurality of leg sections. A printing device of the fifth aspect of the present disclosure, according to the first or second aspect, further includes a pair of first holding sections as the holding section each having an insertion section to be inserted into the first winding core from outside in the extending direction of the first winding core, a first support section as the support section that supports the first holding sections, and a pair of second holding sections as the holding sections each having an insertion section to be inserted into the second winding core from outside in the extending direction of the winding core, and a second supporting section as the supporting section for supporting the second holding sections.

According to the present aspect, a pair of the first holding section and a pair of the second holding section as the holding section, and the first support section and the second support section as the support section are provided. For this reason, in a configuration in which both the first winding core of the wound medium and the second winding core for winding the medium are held, it is possible to configure the printing device to be particularly lowered.

A printing device of the sixth aspect of the present disclosure, according to the fifth aspect, further includes a first restricting section, a second restricting section, a medium support section that is disposed to face the print section and that supports the medium, a plurality of leg sections supporting the medium support section, and a coupling section coupling the plurality of leg sections, wherein the first restricting section is disposed on an opposite side of the first support section than the first holding sections, and restricts rotation of the first holding sections, which are rotatably supported with the first support section as a first rotation shaft, the second restricting section is disposed on an opposite side of the second support section than the second holding sections, and restricts rotation of the second holding sections, which are rotatably supported with the second support section as a second rotation shaft, and the coupling section also serves as the first restricting section and the second restricting section.

According to the present aspect, the first holding section is rotatably supported around the first support section as the first rotation shaft, and is provided with a first restricting section for restricting the rotation of the first holding section on the side opposite to the first holding section with respect to the first rotation shaft, the second holding section is rotatably supported around the second support section as the second rotation shaft, and is provided with a second restricting section for restricting the rotation of the second holding section on the side opposite to the second holding section with respect to the second rotation shaft, the printing device is provided with a plurality of leg sections and a coupling section for coupling the plurality of leg sections, and the coupling section also serves as the first restricting section and the second restricting section. For this reason, the rigidity of the apparatus can be increased by the configuration in which the plurality of leg sections are coupled, and the configuration in which both the rotation of the first holding section around the first support section as the rotation shaft and the rotation of the second holding section around the second support section as the rotation shaft are suppressed can be achieved by the simple configuration of the coupling section coupling the plurality of leg sections.

In a printing device of the seventh aspect of the present disclosure, according to the first or second aspect, the support section is disposed at a position at which at least a portion of the support section overlaps the insertion section as viewed along the first direction.

According to the present aspect, the support section is disposed at a position where at least a part of the support section overlaps with the insertion section when viewed in the first direction. This makes it possible to construct the printing device to be particularly lowered.

Embodiments of the present disclosure will be specifically described below with reference to the drawings. First, an outline of a printing device 1 according to an embodiment of the present disclosure will be described with reference to FIG. 1. In FIG. 1, some of the constituent members are omitted in order to facilitate understanding of the configuration. Here, an X-axis direction in the drawings is a direction in which a rotation shaft (a pipe 19, to be described later) of a holding section 3 which holds a roll body R1 in which the medium M is wound in a roll shape extends. A Y-axis direction is a horizontal direction and is also the front-rear direction of the printing device 1 and is orthogonal to the X axis direction. A Z-axis direction is a vertical direction. In the following description, an arrow direction is defined as a "+" direction and a direction opposite to the arrow direction is defined as a "−" direction. For example, the vertically upward direction is the +Z direction, the vertically downward direction is the −Z direction, the frontward of the printing device 1 is the +Y direction, and the rearward of the printing device 1 is the −Y direction.

The printing device 1 according to the present embodiment includes a main body section 2, and leg sections 13 are attached to both end portions of the main body section 2 in the X-axis direction. The leg sections 13 support a medium support section 4, a medium support section 10, and a medium support section 11 which will be described later. Further, the printing device 1 according to the present embodiment includes a first holding section 3A as the holding section 3 for holding the roll body R1 in which the medium M is wound in a state of being stacked in a roll shape on the −Y direction side, which is the rear side of the main body section 2. The first holding section 3A serves as a feeding section for feeding the medium M from the roll body R1 to the main body section 2, and is provided in an arm section 14 (an arm section 14A) attached to the pipe 19 (a pipe 19A) (to be described later) for coupling the leg sections 13, which are arranged on both sides in the X-axis direction.

In the printing device 1 according to the present embodiment, while the medium M is being transported in the first direction A1, which is the transport direction, an insertion section 15A (to be described later), which is provided in the first holding section 3A and which has a rotation shaft along the X-axis direction, rotates in the rotation direction C. The insertion section 15A is a member to be inserted into a paper tube, which is a winding core (a first winding core) of the roll body R1. While the medium M is being transported in the second direction A2, which is a reverse transport direction opposite to the first direction A1, the insertion section 15A, which has a rotation shaft along the X-axis direction, rotates in a direction opposite to the rotation direction C. In the present embodiment, the roll body R1 which is wound so that the printing surface on which an image is formed is on the outer side is used, but in a case where the roll body R1 which is wound so that the printing surface is on the inner side is used, the holding section 3 can rotate in a direction opposite to the rotation direction C and feed the medium M from the roll body R1.

Further, the printing device 1 according to the present embodiment includes a medium M transport path having the medium support section 4 for supporting the medium M, the medium support section 10, and the medium support section 11. In addition, the printing device 1 includes roller pairs 7 having a drive roller 5 and a driven roller 6 as a transport section for transporting the medium M in the first direction A1 and the second direction A2 in the transport path. In the printing device 1 according to the present embodiment, the drive roller 5 is formed of a roller extending in the widthwise direction B intersecting the first direction A1 and the second direction A2, and a plurality of driven rollers 6 are arranged in the widthwise direction B with respect to the driving roller 5 at a position facing the drive roller 5. However, the configuration of the transporting unit is not particularly limited.

In addition, the printing device 1 according to the present embodiment includes, at a position facing the medium support section 10, a head 8 as a printing section that is provided with a plurality of nozzles and that forms an image by ejecting ink from the nozzles, and a carriage 9 that is mounted with the head 8 and that can reciprocate in the width direction B. In the printing device 1 according to the embodiment, the first direction A1 at the position facing the head 8 on the medium support section 10 is the +Y direction, the second direction A2 is the −Y direction, the widthwise direction B, which is the movement direction of the head 8, is a direction along the X-axis direction, and the ink discharge direction is the −Z direction.

With the above-described configuration, the head 8 can form an image by ejecting ink from nozzles (not illustrated) onto the transported medium M while reciprocating in the widthwise direction B, which is a direction intersecting the first direction A1 and the second direction A2. The printing device 1 according to the present embodiment can form a desired image on the medium M by repeatedly transporting the medium M in the first direction A1 by a predetermined transport amount and ejecting ink while moving the head 8 in the width direction B in a state where the medium M is stopped. However, instead of the head having such a configuration, a configuration may be adopted that includes a so-called line head in which nozzles for ejecting ink are provided over the entire X-axis direction.

The holding section 3 (a second holding section 3B) as a winding section that winds the medium M transported in the first direction A1 in a roll shape to form a roll body R2 is provided downstream of the medium support section 11 in the first direction A1. In the printing device 1 according to the present embodiment, the first holding section 3A and the second holding section 3B have the same configuration, and an insertion section 15B (to be described later) provided in the second holding section 3B rotates in the rotation direction C. The insertion section 15B is a member into which a paper tube which is a winding core (a second winding core) of the roll body R2 is inserted. The second holding section 3B is provided in an arm section 14 (an arm section 14B) attached to a pipe 19 (a pipe 19B, to be described later) which couples the leg sections 13 on both sides in the X-axis direction.

Hereinafter, a main section of the printing device 1 of the present embodiment will be described in detail with reference to FIGS. 2 to 4. Since the first holding section 3A and the second holding section 3B have the same configuration as described above, the first holding section 3A including the arm section 14A is omitted in FIG. 2 in order to make the configuration easier to understand. Here, in both the first holding section 3A and the second holding section 3B, the holding section 3 can be considered to have an insertion section 15, the arm section 14 in which the insertion section 15 is formed, the pipe 19 as a support section, and a stay 16 as the restricting section for restricting the rotation of the arm section 14 about the pipe 19 as the rotation shaft.

Figure 2:
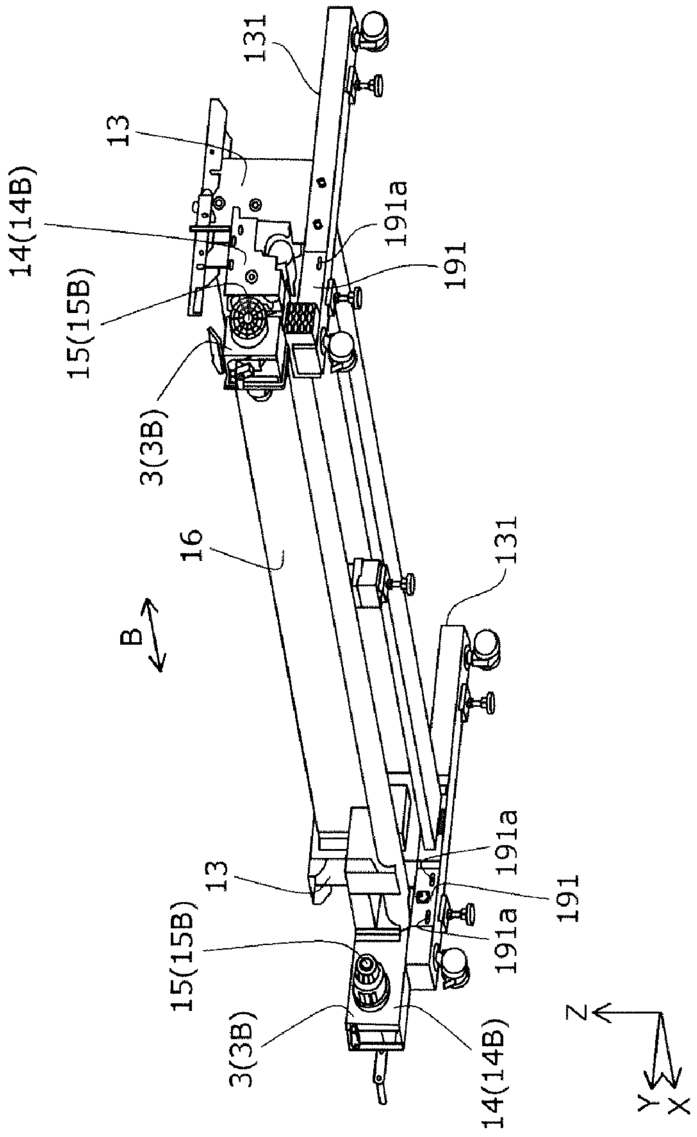
FIG. 2 is a perspective view showing the periphery of the holding section of the printing device of FIG. 1.
Figure 3:
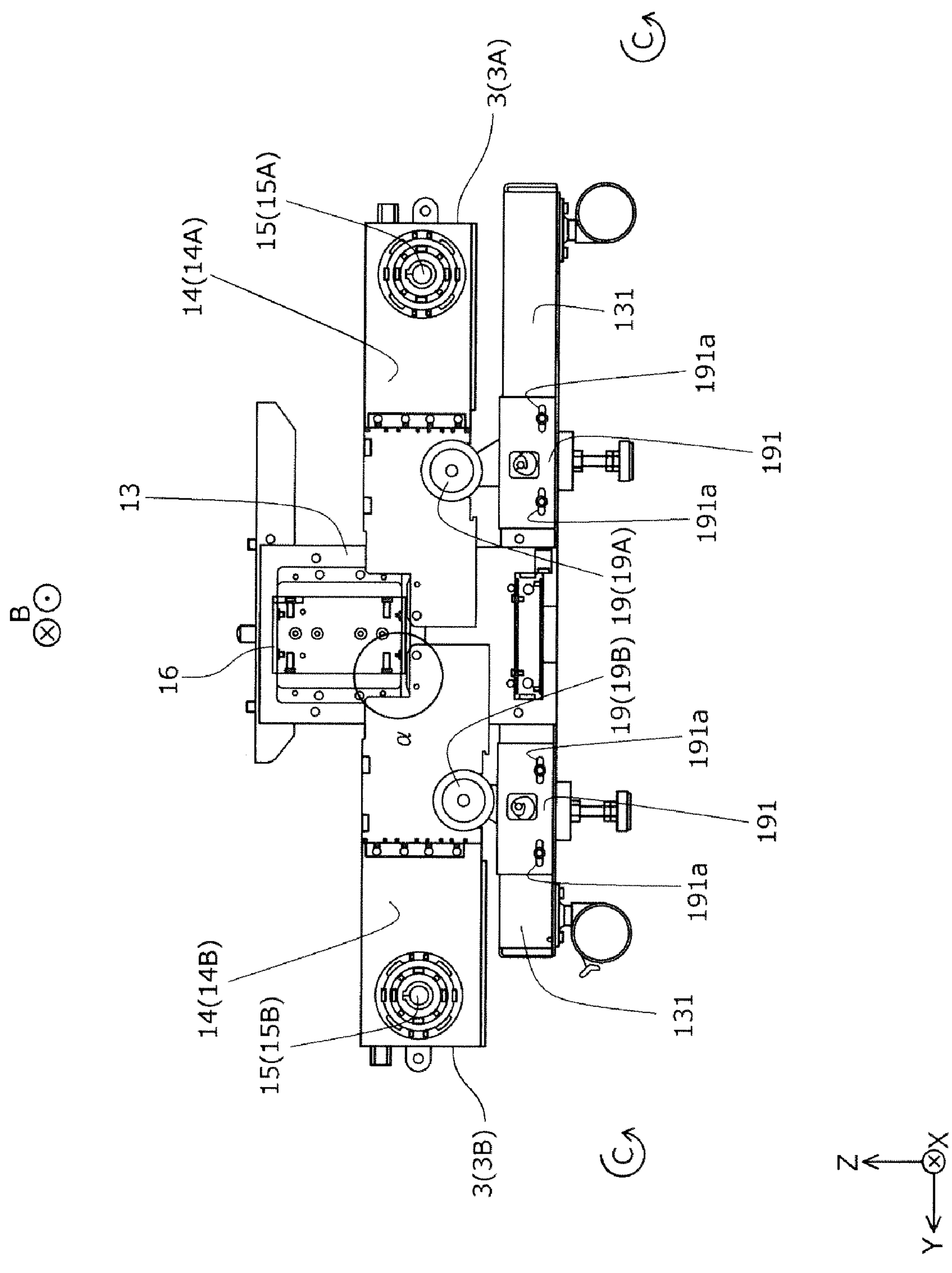
FIG. 3 is a side sectional view showing the periphery of the holding section of the printing device of FIG. 1.

As illustrated in FIG. 3, the printing device 1 according to the present embodiment includes the head 8 that performs printing on the continuous medium M, the pair of first holding sections 3A having an insertion section 15A as the insertion section 15 that is inserted from the outside in the X-axis direction, which is the extending direction of the first winding core with respect to the first winding core of the wound medium M, and the pipe 19A as a support section that supports the first holding section 3A. The pipe 19A is disposed closer to the head 8 side (+Y direction side) than the first holding section 3A in the Y-axis direction as a first direction which is a direction from the first holding section 3A toward the pipe 19A among directions orthogonal to the extending direction of the first winding core. Similarly, as shown in FIGS. 2 and 3, the printing device 1 according to the present embodiment is provided with a pair of the second holding sections 3B having the insertion section 15B to be inserted into a second winding core for winding a medium M from the outside in the X-axis direction, which is the extending direction of the second winding core, and the pipe 19B as a support section for supporting the second holding sections 3B, wherein the pipe 19B is disposed on the head 8 side (−Y direction side) with respect to the second holding sections 3B in the horizontal direction.

As described above, the printing device 1 according to the present embodiment includes the pair of holding sections 3 having the insertion section, which is inserted into the first winding core of the wound medium M or the second winding core for winding the medium M, and the pipe 19, which supports the holding section 3, and the pipe 19 is disposed closer to the head 8 side than the holding section 3 in the horizontal direction. That is, the pipe 19, which enables movement of the holding section 3 in the width direction B, can be disposed in the horizontal direction with respect to the holding section 3, instead of at the lower portion of the holding section 3. Therefore, the printing device 1 according to the present embodiment is configured to be lower in the height direction. Further, by adopting a configuration in which the pipe 19 is not provided in the lower portion of the holding section 3 as in the printing device 1 according to the present embodiment, it is also possible to prevent the pipe 19 from becoming an obstacle when, for example, the printing device 1 is moved using a forklift. In many cases, the roll body R1 of the wound medium M is heavy. However, since the position of an insertion section 15 can be lowered, it is possible to lower the height at which the roll body R1 is lifted, and further, since a space is formed below the position at which the roll body R1 is set, it is possible to reduce the load when setting the roll body R1.

Specifically, in the printing device 1 according to the present embodiment, the pipe 19A is disposed at a position at which at least a portion of the pipe 19A overlaps the insertion section 15A when viewed horizontally, and the pipe 19B is disposed at a position at which at least a portion of the pipe 19B overlaps the insertion section 15B when viewed along the Y-axis direction. As described above, since the pipe 19 is disposed at a position at which at least a portion of the pipe 19 overlaps the insertion section 15 when viewed along the horizontal direction, it is possible to configure the printing device 1 to be particularly lowered.

The pipe 19, that is, both the pipe 19A and the pipe 19B, extends in the X-axis direction, which is the extending direction, and movably supports the holding section 3 along the extending direction. With such a configuration, a winding core such as a paper tube on which the medium M is wound can be easily sandwiched from both sides in the width direction B.

In addition, as shown in FIGS. 2 and 3, the holding section 3, that is, both the first holding section 3A and the second holding section 3B, is rotatably supported in a rotation direction with the pipe 19 as a rotation shaft. In the printing device 1 according to the present embodiment, the stay 16, which serves as a restricting section for restricting rotation of the holding section 3, is provided on the opposite side of the pipe 19 than is the holding section 3 in the Y-axis direction, as the first direction. More specifically, an end portion of the arm section 14 on an opposite side to a side on which the insertion section 15 is provided abuts on the stay 16 to restrict the rotation of the holding section 3. Therefore, it is possible to simplify the configuration of the holding section 3 and the pipe 19, and it is also possible to suppress the holding section 3 from rotating about the pipe 19 as a rotation shaft.

More specifically, the printing device 1 according to the present embodiment is provided with a medium support section 10 arranged to face the head 8, and two leg sections 13 for supporting the medium support section 10, and the stay 16 also serves as a coupling section for coupling the two leg sections 13. By coupling the plurality of leg sections 13 in this manner, the rigidity of the printing device can be increased, and the configuration for suppressing the rotation of the holding section 3 about the pipe 19 as the rotation shaft can be achieved by a simple configuration of the coupling section coupling the plurality of leg sections 13.

Figure 4:
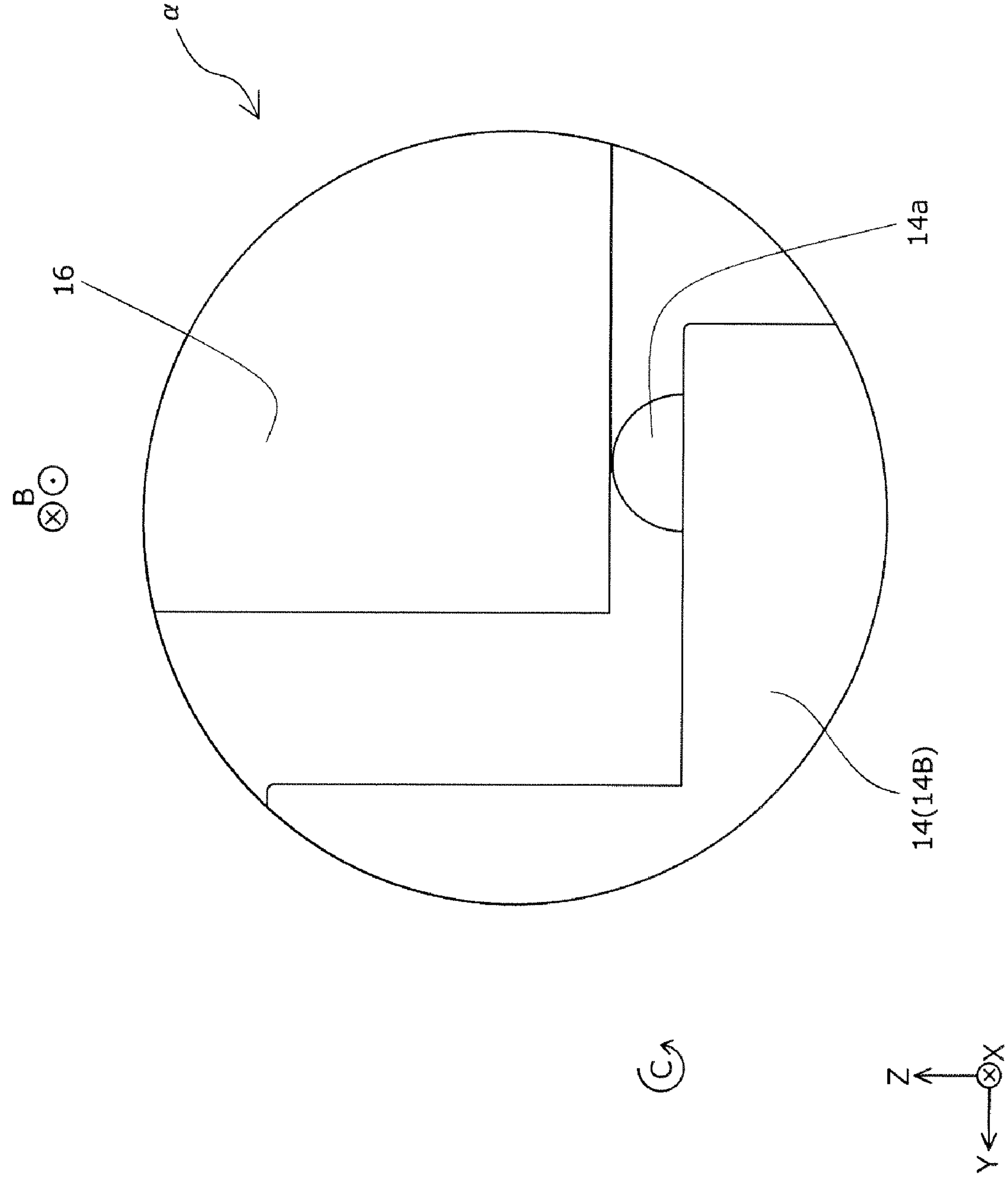
FIG. 4 is a side sectional view showing the region a of FIG. 3.

Note that, as shown in FIG. 4, in the printing device 1 according to the present embodiment, the abutment section **14*a* of the arm section 14 with respect to the stay 16 is a convex member so that the friction force of the abutment portion between the stay 16 and the arm section 14 does not become too large so that the holding section 3 easily moves along the extending direction. By forming the abutment section 14*a* as a convex member, the contact area of the abutment portion between the stay 16 and the arm section 14** can be reduced, and the frictional force of the abutment portion can be prevented from becoming too large. However, it is not limited to such a configuration. For example, a roller or the like may be provided instead of the convex member.

As described above, in the printing device 1 according to the present embodiment, the first holding section 3A and the second holding section 3B have the same configuration. Therefore, the printing device 1 according to the present embodiment can be expressed as including the pair of first holding sections 3A as holding sections 3 having insertion sections 15A inserted into the first winding core from the outside in the extending direction of the winding core, and the pipe 19A as the first supporting section as a supporting section for supporting the first holding sections 3A, also including the pair of second holding sections 3B as holding sections 3 having insertion sections 15B inserted into the second winding core from the outside in the extending direction of the winding core, and the pipe 19B as the second supporting section as the supporting section for supporting the second holding sections 3B. Since the printing device 1 according to the present embodiment has such a configuration, it is possible to configure the printing device 1 to be particularly lower in the configuration in which both the first winding core of the wound medium M and the second winding core for winding the medium M are held.

More specifically, in the printing device 1 according to the present embodiment, the first holding section 3A is rotatably supported by using the pipe 19A as the first rotation shaft, and the stay 16, which functions as a first restricting section which restricts the rotation of the first holding section 3A, is provided on the opposite side of the first rotation shaft than is the first holding section 3A. In addition, in the printing device 1 according to the present embodiment, the second holding section 3B is rotatably supported by using the pipe 19B as the second rotation shaft, and the stay 16, which also functions as the second restricting section which restricts the rotation of the second holding section 3B, is provided on the side opposite to the second holding section 3B with respect to the second rotation shaft. In addition, the printing device 1 according to the present embodiment includes the medium support section 10, which is disposed to face the head 8, a plurality of leg sections 13, which support the medium support section 10, and the stay 16, which serves as the coupling section which couples the plurality of leg sections 13. That is, the stay 16 serving as the coupling section also serves as the first restricting section and the second restricting section. For this reason, in the printing device 1 according to the present embodiment, the rigidity of the printing device can be increased by coupling the plurality of leg sections 13, and a configuration of suppressing both the rotation of the first holding section 3A around the pipe 19A as the rotation shaft and the rotation of the second holding section 3B around the pipe 19B as the rotation shaft can be achieved by a simple configuration of the stay 16 which couples the plurality of leg sections 13.

In the printing device 1 according to the present embodiment as shown in FIG. 3, both the pipe 19A and the pipe 19B have a circular cross section. Therefore, although the holding section 3 is structured to be easily rotated around the pipe 19 as the rotation shaft, the holding section 3 is easily moved along the extending direction of the supporting section by configuring the supporting section so that the cross section of the pipe 19 is circular. However, the present disclosure is not limited to such a configuration, and for example, the cross section of the support section for supporting the holding section 3 may be rectangular. In a case where the cross section of the support section supporting the holding section 3 is a polygon such as a rectangle, the rotation suppressing structure of the holding section 3 can be simplified.

In the printing device 1 according to the present embodiment, as shown in FIG. 3, a shaft section 131 extending in the Y-axis direction is provided on the leg section 13, and a support mechanism 191 for the pipe 19 is attached to the shaft section 131. An elongated hole **191*a*, which is elongated in the Y-axis direction, is provided in the support mechanism 191, and the support mechanism 191 is screwed to the shaft section 131 via the elongated hole 191*a*, whereby the support mechanism 191 is attached to the shaft section 131. With this configuration, the position of the support mechanism 191 with respect to the shaft section 131 in the Y-axis direction can be adjusted substantially by the length of the elongated hole 191*a* in the Y-axis direction. That is, the position of the pipe 19 with respect to the leg section 13** in the Y-axis direction can be adjusted. However, it is not limited to such a configuration.

In addition, in the printing device 1 according to the present embodiment the stay 16 is screwed to the leg section 13, and a hole through which a screw for screwing the stay 16 to the leg section 13 is inserted is formed to be wider than a shaft section of the screw. Therefore, the stay 16 can be adjusted in the horizontal direction, the vertical direction, and the rotational direction with the X-axis direction as the rotational shaft with respect to the leg section 13 by a gap between the hole through which the screw is inserted and the shaft section of the screw. In this way, by making the position of the stay 16 adjustable with respect to the position of the leg section 13, for example, the winding deviation of the roll body R2 can be reduced. However, it is not limited to such a configuration.

The present disclosure is not limited to the above-described embodiments, and can be realized by various configurations without departing from the scope of the disclosure. In addition, the technical features in the embodiments corresponding to the technical features in the aspects described in the summary of the disclosure can be appropriately replaced or combined in order to solve a part or all of the problems described above or in order to achieve a part or all of the effects described above. In addition, if a technical feature is not described as an essential feature in the present specification, the technical feature can be deleted as appropriate.

What is claimed is:

1. A printing device comprising:

a print section for printing on a continuous medium;

a pair of holding sections each having an insertion section configured to be inserted into a winding core, which is either a first winding core for wound medium or a second winding core for winding up the medium, from an outer side in an extending direction of the winding core; and a support section configured as a rotation shaft for rotatably supporting the holding sections, wherein the support section is disposed closer to the print section than the holding sections in a first direction, which is, among directions perpendicular to the extending direction of the winding core, a direction from the holding sections toward the support section.

2. The printing device, according to claim 1, wherein the support section extends in the extending direction and supports the holding sections so that the holding sections are movable along the extending direction.

3. The printing device, according to claim 1, further comprising:

a restricting section, wherein the restricting section is disposed on an opposite side of the support section than the holding sections with respect to the first direction and restricts rotation of the holding sections.

4. The printing device, according to claim 3, further comprising:

a medium support section that is disposed to face the print section and that supports the medium;

a plurality of leg sections supporting the medium support section; and a coupling section coupling the plurality of leg sections, wherein the coupling section also serves as the restricting section.

5. The printing device, according to claim 1, further comprising:

a pair of first holding sections as the holding sections each including an insertion section to be inserted into the first winding core from the outside in the extending direction of the first winding core;

a first support section as the support section that supports the first holding sections;

a pair of second holding sections as the holding sections each having an insertion section to be inserted into the second winding core from outside in the extending direction of the second winding core; and a second support section as the support section for supporting the second holding sections.

6. The printing device, according to claim 5, further comprising:

a first restricting section;

a second restricting section;

a medium support section that is disposed to face the print section and that supports the medium;

a plurality of leg sections supporting the medium support section; and a coupling section coupling the plurality of leg sections, wherein the first restricting section is disposed on an opposite side of the first support section than the first holding sections, and restricts rotation of the first holding sections, which are rotatably supported with the first support section as a first rotation shaft, the second restricting section is disposed on an opposite side of the second support section than the second holding sections, and restricts rotation of the second holding sections, which are rotatably supported with the second support section as a second rotation shaft, and the coupling section also serves as the first restricting section and the second restricting section.

7. The printing device, according to claim 1, wherein the support section is disposed at a position at which at least a portion of the support section overlaps the insertion section as viewed along the first direction.

8. A printing device comprising:

a print section for printing on a continuous medium;

a pair of holding sections each having an insertion section configured to be inserted into a winding core, which is either a first winding core for wound medium or a second winding core for winding up the medium, from an outer side in an extending direction of the winding core;

a support section for supporting the holding sections;

a pair of first holding sections as the holding sections each including an insertion section to be inserted into the first winding core from the outside in the extending direction of the first winding core;

a first support section as the support section that supports the first holding sections;

a pair of second holding sections as the holding sections each having an insertion section to be inserted into the second winding core from outside in the extending direction of the second winding core;

a second support section as the support section for supporting the second holding sections;

a first restricting section;

a second restricting section;

a medium support section that is disposed to face the print section and that supports the medium;

a plurality of leg sections supporting the medium support section; and a coupling section coupling the plurality of leg sections, wherein the support section is disposed closer to the print section than the holding sections in a first direction, which is, among directions perpendicular to the extending direction of the winding core, a direction from the holding sections toward the support section, the first restricting section is disposed on an opposite side of the first support section than the first holding sections, and restricts rotation of the first holding sections, which are rotatably supported with the first support section as a first rotation shaft, the second restricting section is disposed on an opposite side of the second support section than the second holding sections, and restricts rotation of the second holding sections, which are rotatably supported with the second support section as a second rotation shaft, and the coupling section also serves as the first restricting section and the second restricting section.

* * * * *